"""
US006991282B2

(12) United States Patent
Suzuki et al.

(10) Patent No.: US 6,991,282 B2
(45) Date of Patent: Jan. 31, 2006

(54) APPARATUS FOR CONTROLLING RIGIDITY OF VEHICLE BODY

(75) Inventors: Shunji Suzuki, Saitama (JP); Yuta Urushiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/938,650

(22) Filed: Sep. 13, 2004

(65) Prior Publication Data
US 2005/0088010 A1    Apr. 28, 2005

(30) Foreign Application Priority Data
Oct. 23, 2003  (JP)  ............................. 2003-362910

(51) Int. Cl.
*B60R 19/18* (2006.01)
(52) U.S. Cl. .............................. 296/187.03; 296/187.1; 293/133; 188/377
(58) Field of Classification Search ........... 296/187.03, 296/187.04, 187.09, 187.1; 293/132, 133; 188/371, 377
See application file for complete search history.

(56) References Cited

U.S. PATENT DOCUMENTS 5,033,593 A * 7/1991 Kazuhito .................... 188/377
5,460,421 A   10/1995 Culbertson
6,286,895 B1   9/2001 Urushiyama et al.
6,290,272 B1 * 9/2001 Braun ........................ 293/120

FOREIGN PATENT DOCUMENTS

EP   0 926 049 B1   5/2002
JP   11-291951   10/1999

* cited by examiner

*Primary Examiner*—Dennis H. Pedder
(74) *Attorney, Agent, or Firm*—Arent Fox PLLC

(57) ABSTRACT

An apparatus for controlling rigidity of a vehicle body includes a wall to which a collision load is imposed from its front end side, a base member disposed at a rear end side of the wall, a slide member having opposite top and bottom plates and one vertical plate contiguously extending between edges of the top and bottom plates, and actuators for establishing and releasing connection between the wall and the slide member. The top plate is disposed over a top end (upper end portion) of the wall, the bottom plate is disposed underneath a bottom end (lower end portion) of the wall, and the vertical plate is disposed at the front end of the wall. The slide member is slidable with respect to the base member in a collision. The actuators serve to establish the connection between the top end and the top plate and between the bottom end and the bottom plate.

16 Claims, 6 Drawing Sheets

APPARATUS FOR CONTROLLING RIGIDITY OF VEHICLE BODY

BACKGROUND OF THE INVENTION

This invention relates to apparatuses for controlling the rigidity of a vehicle body. In a vehicle having a collision impact energy-absorbing construction, an apparatus consistent with the present invention can control the rigidity of a frame or other components of a vehicle body so as to obtain an adequate reaction load in a collision, depending upon the form of the collision and/or an object against which the vehicle collides.

Applicant of the present application has previously devised, and disclosed in JP 11-291951 A, an apparatus for controlling the rigidity of a vehicle body, which uses piezoelectric actuators disposed on side frames provided at right and left sides of the vehicle to adaptively generate a force restraining the side frames from deforming or a force assisting the side frames in deforming at each point of the side frames in the event of a collision, thereby enhancing or abating the rigidity of each side frame so as to have optimum impact energy absorbency conforming with the form of the collision. To be more specific, this apparatus is configured, for example, to render the both side frames less rigid in the event of a full frontal crash where the vehicle collides with its entire front engaged, and to render one of the side frames more rigid in the event of an offset frontal crash where the vehicle collides with part of the front of the vehicle engaged such that the collision load concentrates on the one of the side frames; thus, an optimum impact energy absorption can be ensured in either form of the collision.

In addition to the adaptive rigidity control according to the form of the collision such as a full frontal or offset frontal crash as discussed above, an apparatus for controlling the rigidity of a vehicle body as above may conceivably be configured to exercise a control over a reaction force applied to an object against which the vehicle collides according to the dimensions of the object.

However, the construction and underlying mechanism of the aforementioned apparatus relies on the action of the piezo-electric actuators for generating a force resisting the collision load, i.e., a great force for receiving the collision force, and thus requires a large amount of electricity. This disadvantageously results in unfavorable upsizing of the piezo-electric actuators and of battery for powering the piezo-electric actuators.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is one aspect of the present invention to provide an apparatus for controlling the rigidity of a vehicle body capable of controlling the rigidity with a relatively small force without a large amount of electricity.

More specifically, in another aspect of the present invention, there is provided an apparatus for controlling rigidity of a vehicle body, which includes but not limited thereto a plate member, a base member, a slide member and an attachment. The plate member disposed parallel with a direction of a collision load has a first end facing toward the direction of the collision load from which the collision load is applied to the vehicle body, a second end opposite to the first end, and top and bottom ends. The base member is disposed at the second end of the plate member. The slide member has opposite top and bottom plates and one vertical plate contiguously extending between edges of the top and bottom plates, with the top plate disposed over the top end of the plate member, the bottom plate disposed underneath the bottom end of the plate member, and the vertical plate disposed at the first end of the plate member. The slide member is slidable with respect to the base member in a collision. The attachment is a member for establishing and releasing connection between the top end of the plate member and the top plate of the slide member and between the bottom end of the plate member and the bottom plate of the slide member. The connection may, preferably but not necessarily, be established at a plurality of points arranged at corresponding locations on each of the top and bottom ends of the plate member, and the attachment is configured to partially release the connection selectively at some of the plurality of the points.

In this construction, when the attachment is released to disconnect the plate member and the slide member in the event of a collision, the plate member crushed by the vertical plate of the slide member is buckled in a primary deformation mode defined as a deformation mode in which the member is buckled with a single antinode, and the rigidity of the plate member therefore becomes lower. In contrast, when the attachment is engaged to establish the connection between the plate member and the slide member in the event of a collision, in particular if the connection is established between the top end of the plate member and the top plate of the slide member and between the bottom end of the plate member and the bottom plate of the slide member at a plurality of points arranged at corresponding locations on each end of the plate member, the plate member crushed by the vertical plate of the slide member is buckled in a higher-order deformation mode defined as a deformation mode in which the member is buckled with multiple antinodes, and the rigidity of the plate member therefore becomes higher. Accordingly, an adequate control can be exercised over the rigidity of a vehicle body merely by establishing or releasing the connection between the plate member and the slide member at points arranged along the top and bottom ends of the plate member, with a relatively small force. Since this construction can obviate the need for a large amount of electricity, the apparatus can be made smaller in that an actuator for use in controlling the rigidity as well as a battery for powering the actuator can be made in reduced size.

In the above apparatus, opposite surfaces of the top and bottom plates of the slide member may preferably, but not necessarily, be formed with projections and depressions. This construction can contribute to the improved rigidity of the slide member.

The above projections and depressions formed on the opposite surfaces of the top and bottom plates may preferably, but not necessarily, be arranged in such a manner that the opposite surfaces are plane-symmetric to each other, and the plate members may be arranged at positions corresponding to the projections (i.e., portions nearer to each other) of the opposite surfaces of the top and bottom plates. This construction allows the apparatus to incorporate a plate member having a shortened vertical dimension, and thus can serve to further improve the rigidity of the slide member.

The above plate member may preferably, but not necessarily, be made of a shape-memory alloy.

Hereupon, "shape-memory alloy" is a material varying in buckling load and strain energy according to the length, more greatly than aluminum alloys and ferrous materials. Specifically, the shape-memory alloy characteristically has a buckling load exhibiting a peak in a primary buckling, and decreasing after the primary buckling as is the case with aluminum alloys and ferrous materials if the alloy is of a specific length or longer, but raised again after the primary buckling if the alloy is below the specific length. The shape-memory alloy is a material having a particular plastic deformation mode under two-step stress-strain relationship, which yields to a specific lower stress and is then subjected to plastic deformation to a specific amount of strain, thereafter subjected to elastic deformation with the stress raised again, and eventually yields to a specific higher stress. Therefore, if the length of the shape-memory alloy is below a specific length, the second step in the stress-strain relationship has a profound effect on a plastic deformation mode of the shape-memory alloy, and thus the buckling load rises again after the primary buckling occurs.

The use of a shape-memory alloy having the characteristics as described above makes it possible to make a fine adjustment in control over the rigidity of the vehicle body as follows: when any points arranged on each end of the plate member are not connected with corresponding points arranged on each of the top and bottom plates, a deformable portion of the plate member becomes the longest, equal to or longer than the specific length, and thus the plate member is buckled by a lower load; on the other hand, when some points arranged on each end of the plate member are connected with corresponding points arranged on each of the top and bottom plates, the deformable portion of the plate member is divided into shorter pieces, each having a length below the specific length, and thus the plate member is buckled by a higher load (much higher compared with the lower load) because the plate member exhibits a high buckling load again after the primary buckling occurs. Consequently, the shape-memory alloy used in the plate member serves to provide a wide variation in buckling loads from that which is exhibited when the plate member is buckled in the primary deformation mode to that which is exhibited when the plate member is buckled in the higher-order deformation mode. The buckling load of the plate member can thus be varied in a wide range, so that the rigidity of the vehicle can be controlled in such a wide range.

The above and other aspects, advantages and further features of the present invention will become readily apparent from the following description of illustrative, non-limiting embodiments thereof with reference to accompanying drawings.

DETAILED DESCRIPTION OF THE EXEMPLARY EMBODIMENTS

A detailed description will be given of an exemplary embodiment of the present invention with reference made as appropriate to the drawings.

Figure 1:
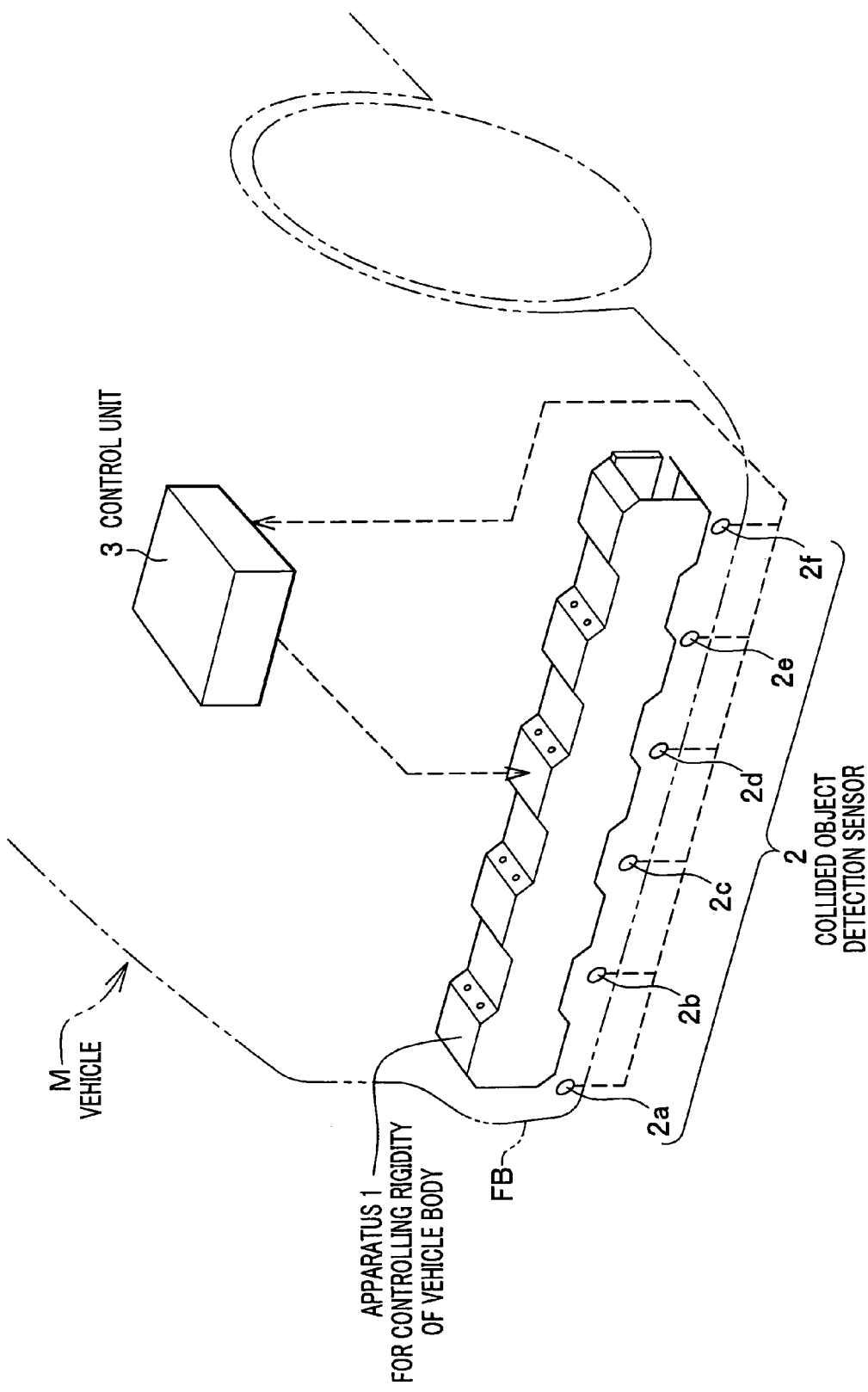
FIG. 1 is a perspective view showing a front portion of a vehicle equipped with an apparatus for controlling the rigidity of the vehicle according to one exemplary embodiment of the present invention.

Referring now to FIG. 1, a vehicle M includes an apparatus 1 for controlling the rigidity of a vehicle body, a collided object detection sensor 2, and a control unit 3 for controlling the apparatus 1 based upon a detection signal from the collided object detection sensor 2. The apparatus 1 and the collided object detection sensor 2 are provided within a front bumper FB of the vehicle M. In the following description, a plurality of sensing elements of the collided object detection sensor 2 will be referred to by reference characters 2a, 2b, 2c, 2d, 2e and 2f, in this sequence from the right side of the vehicle M, for convenience in explanation. In addition, the longitudinal direction (parallel to a line extending toward the front or rear) of the vehicle M, the lateral direction (rightward or leftward) of the vehicle M, and the vertical direction (upward or downward) of the vehicle M will be referred to simply as "vehicle length direction", "vehicle width direction" and "vehicle height direction", respectively.

Figure 2:
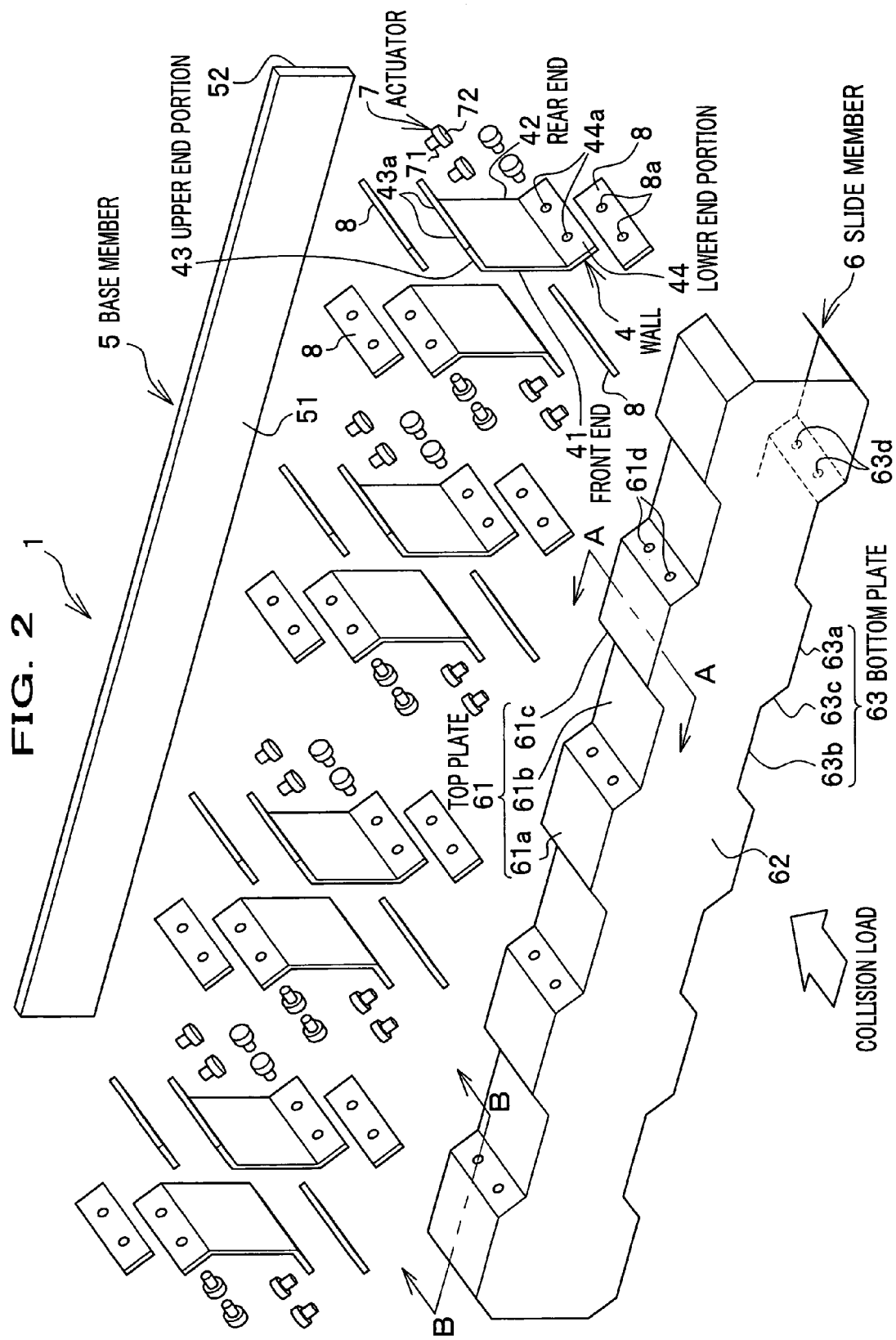
FIG. 2 is an exploded perspective view showing the apparatus of FIG. 1.

Turning to FIG. 2, the apparatus 1 includes, as principal components, a plurality of walls (plate members) 4 disposed in a direction parallel to the vehicle length direction (i.e., a direction of a collision load), a base member 5 for supporting the walls 4, and a slide member 6 shaped substantially like a letter U in cross section. The apparatus 1 also includes actuators (attachments) 7 for establishing and releasing connection between the walls 4 and the slide member 6.

The walls 4, which are plate members made of a shape-memory alloy, are equally spaced out along the longitudinal direction of the base member 5. Each wall 4 has a front end (first end facing toward the direction of the collision) 41 joined with the slide member 6, a rear end (second end opposite to the first end) 42 joined with the base member 5, and top and bottom ends. Although the wall 4 is joined with both of the slide member 6 and the base member 5 in the present embodiment, the present invention is not limited to this configuration, and it is to be understood that the wall 4 may be joined with at least one of the slide member 6 and the base member 5.

Each wall 4 is comprised of three plate-shaped portions: an upper end portion 43 having the top end at its upper edge, a lower end portion 44 having the lower end at its lower edge, and a vertical midsection contiguously formed therebetween. The upper and lower end portions 43 and 44 are obliquely bent with respect to the vertical midsection. In the upper end portion 43 of the wall 4 are formed two holes 43a in an arrangement parallel to the vehicle length direction, while in the lower end portion 44 are formed two holes 44a, similar to the holes 43a, in positions corresponding to the holes 43a of the upper end portion 43. It is therefore understood that the two holes 43a of the upper end portion 43 are aligned with the two holes 44a of the lower end portion 44, and thus disposed at the same position in the vehicle length direction.

The base member 5 is a generally rectangular parallelepiped plate member extending in the vehicle width direction. Two vertical surfaces 51 and 52 oriented toward the front and the rear of the vehicle M respectively (thus, hereinafter referred to as "front face 51" and "rear face 52" respectively) are disposed so as to face toward the rear ends 42 of the walls 4 and to extend in a direction perpendicular to the vehicle length direction. The base member 5 has the rear face 52 joined with a front portion of the vehicle M (to which the front bumper FB is attached; see FIG. 1) with the front face 51 joined with the rear ends 42 of the walls 4. In the present invention, the base member 5 is described as a member having faces (front and rear faces 51, 52) perpendicular to the vehicle length direction for purposes of explanation; however, the relevant faces of the base member 5 may in actuality be substantially curved in a manner bilaterally symmetrical with respect to a hypothetical median plane extending in the vehicle length and height directions so as to fit onto the curved front portion of the vehicle to which the front bumper FB is attached. In this context, the base member 5 is disposed in such a manner that a tangent plane to the curved face (51 or 52) at a front-end point thereof (typically contained in the above hypothetical median plane) is parallel with the vehicle width direction.

The slide member 6 is, like the walls 4, made of a shape-memory alloy, and comprised of a top plate 61, a front plate 62, and a bottom plate 63. The slide member 6 has one vertical front plate 62 contiguously extending between edges of the opposite top and bottom plates 61 and 63, and is thus shaped substantially like a letter U in cross section with a rear side thereof open. The slide member 6 is disposed, by putting the front ends 41 of the walls 4 through the open rear side of the slide member 6 toward the front plate 62 thereof, to encase the walls 4 with the upper end portions 43 and lower end portions 44 thereof covered with the top plate 61 and bottom plate 63 of the slide member 6, respectively. The top plate 61 and bottom plate 63 of the slide member 6 are spaced apart so that distances between the plates 61 and 63, even the distance at the shortest (the distance between an inner flat surface portion 61b and an inner flat surface portion 63b, which will be described later), are greater than the vertical dimension of the base member 5 (see also FIG. 3A), thus allowing the slide member 6 to move with respect to the base member 5 in a collision.

The top and bottom plates 61, 63 (opposite surfaces thereof) of the slide member 6 are formed with projections and depressions arranged in such a manner that the opposite surfaces of the top and bottom plates 61, 63 are plane-symmetric to each other. To be more specific, the top plate 61 is comprised of outer flat surface portions 61a disposed in outwardly bulged (upper) positions, inner flat surface portions 61b disposed in inwardly recessed (lower) positions relative to the outer flat surface portions 61a, and oblique surface portions 61c smoothly joining opposed sides of the adjacent outer and inner flat surface portions 61a, 61b together, which surface portions 61a, 61b, 61c are arranged in its longitudinal direction (the vehicle width direction) in such a manner that the outer and inner flat surface portions 61a, 61b are alternately disposed with the oblique surface portions 61c contiguously interposed therebetween, so as to form projections and depressions. Similarly, the bottom plate 63, like the top plate 61, is comprised of outer flat surface portions 63a disposed in outwardly bulged (lower) positions, inner flat surface portions 63b disposed in inwardly recessed (upper) positions relative to the outer flat surface portions 63a, and oblique surface portions 63c smoothly joining opposed sides of the adjacent outer and inner flat surface portions 63a, 63b together, which surface portions 63a, 63b, 63c are arranged in the vehicle width direction in such a manner that the outer and inner flat surface portions 63a, 63b are alternately disposed with the oblique surface portions 61c contiguously interposed therebetween, so as to form projections and depressions. The outer flat surface portions 61a of the top plate 61 are disposed in positions corresponding to those of the outer flat surface portions 63a of the bottom plate 63, whereas the inner flat surface portions 61b of the top plate 61 are disposed in positions corresponding to those of the inner flat surface portions 63b of the bottom plate 63, so that the projections and depressions formed on the opposite surfaces (facing inside upwardly and downwardly) of the top and bottom plates 61, 63 are arranged in such a manner that the opposite surfaces are plane-symmetric to each other with respect to the hypothetical plane located midway between, and equidistant from, the top and bottom plates 61, 63.

The walls 4 are arranged near positions corresponding to the closer portions (projections) of the opposite surfaces of the top and bottom plates 61, 63; that is, each wall 4 is provided to have a vertical midsection thereof extend between an edge in the top plate 61 at which an inner flat surface portion 61b and an oblique surface portion 61c meet and an edge in the bottom plate 63 at which an inner flat surface portion 63b and an oblique surface portion 63c meet. The obliquely bent upper and lower end portions 43 and 44 of each wall 4 are designed to face to the oblique surface portions 61c and 63c, respectively, and approximately rectangular plate-like reinforcing members 8 made of a shape-memory alloy are interposed between the upper end portion 43 of the wall 4 and the oblique surface portion 61c of the slide member 6 and between the lower end portion 44 of the wall 4 and the oblique surface portion 63c of the slide member 6. In the oblique surface portions 61c, 63c of the slide member 6 and the reinforcing members 8 are each formed two holes 61d, 63d and 8a, respectively, in positions corresponding to the two holes 43a provided in the upper end portion 43 of the wall 4 or the two holes 44a provided in the lower end portion 44 of the wall 4.

Figure 3B:
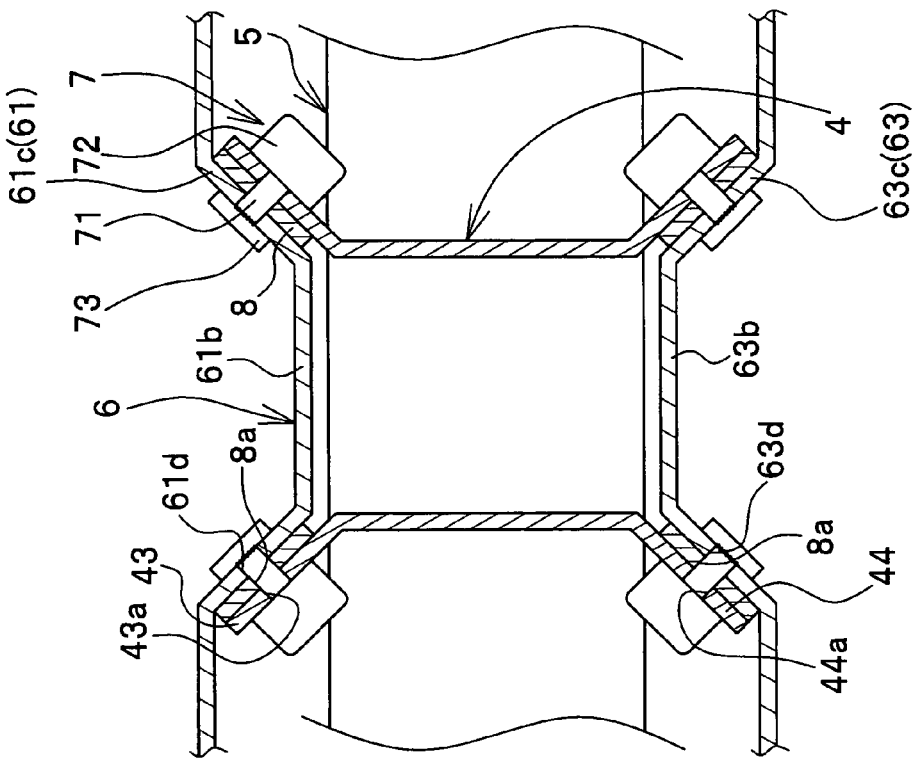
FIG. 3B is a section taken along line B—B of FIG. 2 for illustrating a portion near an actuator of the apparatus.
Figure 3A:
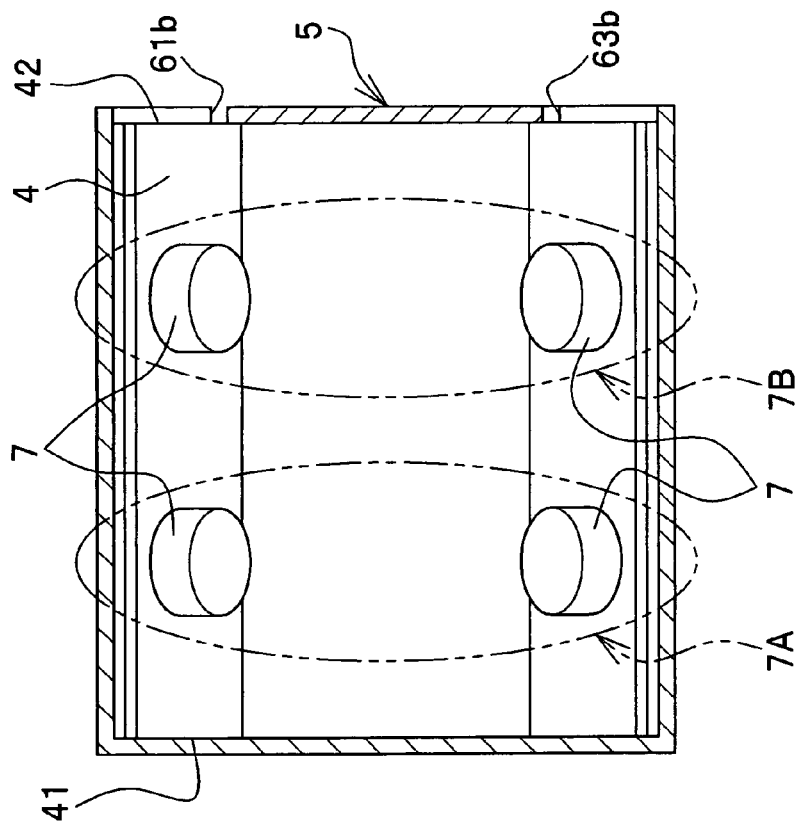
FIG. 3A is a section taken along line A—A of FIG. 2 for illustrating a portion near an actuator of the apparatus.

The actuators 7 are electromagnetic solenoids each comprised principally of a movable pin 71 and a driving element 72. The movable pin 71 of the actuator 7 is attached at its proximal end to the driving element 72 and configured to retractably protrude in its axial direction from the driving element 72. The driving element 72 of the actuator 7 serves a function of driving the movable pin 71 to retract into the driving element 72. More specifically, as shown in FIG. 3B, each actuator 7 is provided in a manner that permits the movable pin 71 to protrude through the holes 43a (44a), 8a and 61d (63d) provided in the three components (wall 4, reinforcing member 8 and slide member 6). At a distal end of the movable pin 7 is provided a fastener 73, which serves to fasten the above three components together in combination with the movable pin 71 and the driving element 72 in normal times, but is configured to come off easily by a driving force of the driving element 72. In the following discussion, among four actuators 7 provided in one wall 4 (see FIG. 3A), one pair of upper and lower actuators 7 provided nearer to the front of the vehicle will be referred to as "front-side actuators 7A", and the other pair of upper and lower actuators 7 provided nearer to the rear of the vehicle will be referred to as "rear-side actuators 7B", as appropriate.

When the movable pins 71 protruding from the driving elements 72 are inserted in the holes 43a (44a), 8a and 61d (63d) of the above three components with the fasteners 73 attached to the distal ends of the movable pins 71, the upper end portion 43 and lower end portion 44 of the wall 4 are fastened to the top plate 61 (oblique surface portion 61c thereof) and bottom plate 63 (oblique surface portion 63c thereof) of the slide member 6, respectively. On the other hand, when the movable pins 71 retract into the driving elements 72 and is pulled out of the holes 43a (44a), 8a and 61d (63d) with the fasteners 73 detached from the distal ends of the movable pins 71, the upper end portion 43 and lower end portion 44 of the wall 4 are unfastened from the top plate 61 (oblique surface portion 61c thereof) and bottom plate 63 (oblique surface portion 63c thereof) of the slide member 6, respectively. In other words, when the actuators 7 are in the "OFF" state, the above three components remain joined together with the movable pins 71, and once the actuators 7 are turned "ON", the movable pins 71 retract, with the fasteners 73 coming off the distal ends of the movable pins 71, and thus the above three components are unfastened to become separable. In normal times (when no collision or other accident like that occurs), the actuators 7 are invariably in the "OFF" state; in a collision, a control unit 3, which will be described later, switches the actuators 7 from the "OFF" state to the "ON" state, where appropriate.

The sensing elements 2a, 2b, 2c, 2d, 2e and 2f of the collided object detection sensor 2 as shown in FIG. 1 are devices capable of detecting and determining hardness of an object to be collided with. Various types of sensors known in the art may be used, which include, for example: a camera for capturing an image of an object to be collided with, an infrared sensor for sensing the temperature of an object to be collided with, and a strain gauge for measuring the deformation of a vehicle in a collision. The control unit 3 determines the hardness of an object to be collided with from the outputs (e.g., image data, temperature, degree of deformation, etc.) of the sensing elements 2a, 2b, 2c, 2d, 2e and 2f of the collided object detection sensor 2, and controls the actuators 7 of the apparatus 1 for controlling the rigidity of a vehicle body according to the hardness of the object to be collided with, a vehicle speed detected by a speed sensor (not shown), and the like. In the present embodiment, the devices capable of detecting and determining the hardness of an object to be collided with are adopted as the sensing elements 2a, 2b, 2c, 2d, 2e and 2f of the collided object detection sensor 2, but the present invention is not limited thereto. For example, distance sensors using a laser beam or ultrasonic wave to determine a distance from an object to be collided with may be employed as the sensing elements 2a, 2b, 2c, 2d, 2e and 2f of the collided object detection sensor 2. In this instance, the rigidity of the apparatus 1 for controlling the rigidity of a vehicle body may be changed according to the forms of the collision such as a full frontal crash and an offset frontal crash.

The control unit 3 may also determine the size of an object to be collided with from the outputs of the sensing elements 2a, 2b, 2c, 2d, 2e and 2f of the collided object detection sensor 2. To be more specific, if the control unit 3 receives detection signals from the collided object detection sensor 2 and discerns that four or more of adjacent sensing elements among the sensing elements 2a, 2b, 2c, 2d, 2e and 2f of the collided object detection sensor 2 detect an object to be collided with, then the control unit 3 determines that the object to be collided with is large. On the other hand, if the control unit 3 having received detection signals from the collided object detection sensor 2 discerns that three or less of adjacent sensing elements among the sensing elements 2a, 2b, 2c, 2d, 2e and 2f of the collided object detection sensor 2 detect an object to be collided with, then the control unit 3 determines that the object to be collided with is small. Accordingly, the control unit 3 exercises control over the actuators 7 so that each of the actuators 7 is turned into the "ON" state or held in the "OFF" state on the basis of the size and hardness of the object to be collided with as thus determined. More specifically, the control unit 3 independently controls the front-side actuator 7A and the rear-side actuator 7B attached to each wall (see FIG. 3A) as appropriate to regulate (switch) the deformation mode of the wall 4.

Figure 4A:
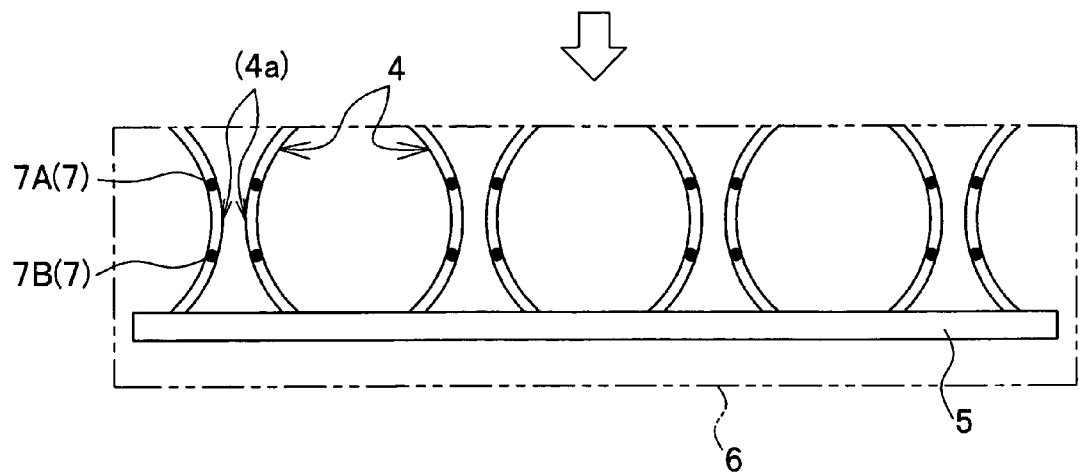
FIG. 4A is a schematic diagram showing a transverse section of the apparatus of FIG. 1, with walls thereof buckled in a primary deformation mode.
Figure 4B:
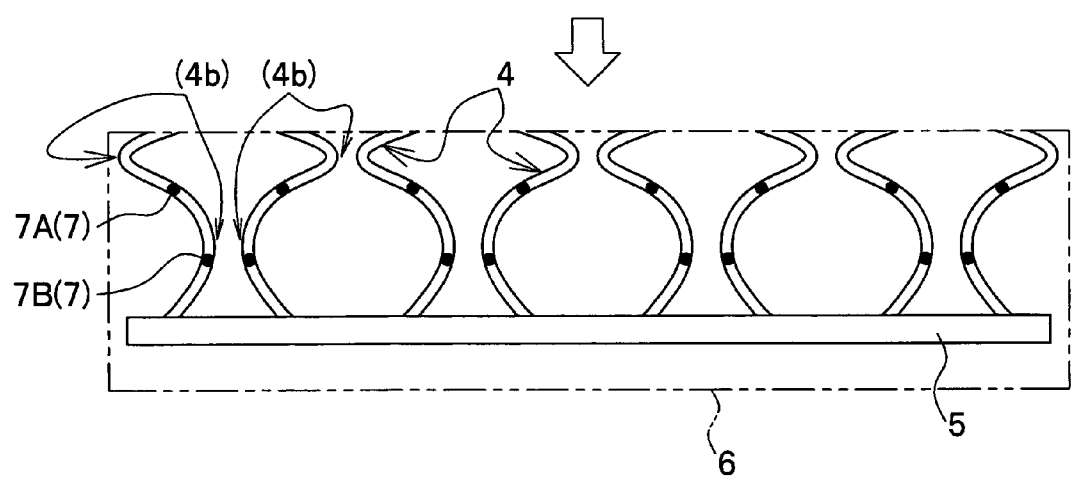
FIG. 4B is a schematic diagram showing a transverse section of the apparatus of FIG. 1, with walls thereof buckled in a secondary deformation mode.

Next, a description will be given of three (primary, secondary and tertiary) deformation modes of the walls 4 according to the present embodiment with reference to FIGS. 4A, 4B and 4C in which traverse sections of the apparatus 1 for controlling the rigidity of a vehicle body are schematically illustrated. FIG. 4A shows the walls 4 buckled in a primary deformation mode; FIG. 4B shows the walls 4 buckled in a secondary deformation mode; and FIG. 4C shows the walls 4 buckled in a tertiary deformation mode.

Figure 4C:
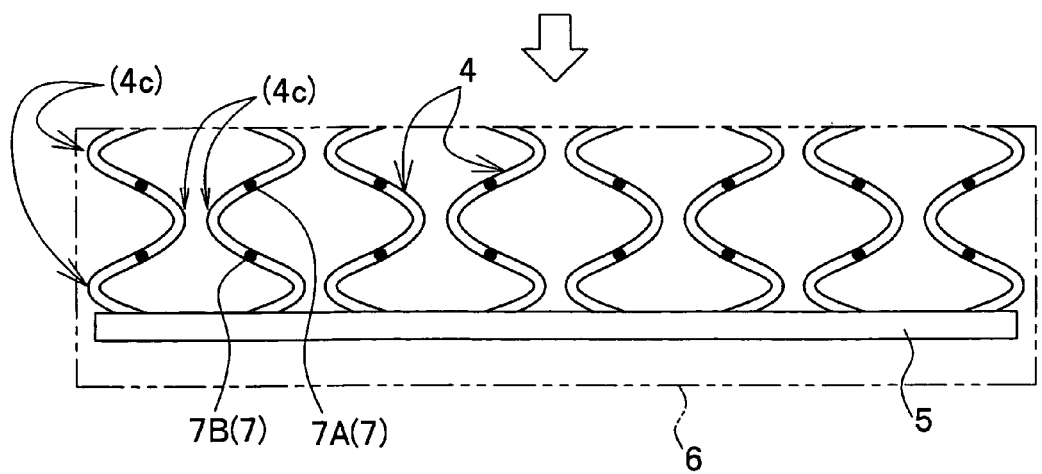
FIG. 4C is a schematic diagram showing a transverse section of the apparatus of FIG. 1, with walls thereof buckled in a tertiary deformation mode.

Among three deformation modes in the present embodiment, the primary deformation mode is the one in which each wall 4 is buckled with a single antinode 4a as shown in FIG. 4A, the secondary deformation mode is the one in which each wall 4 is buckled with two antinodes 4b as shown in FIG. 4B, and the tertiary deformation mode is the one in which each wall 4 is buckled with three antinodes 4c as shown in FIG. 4C. To be more specific, each wall 4 is buckled in the primary deformation mode as shown in FIG. 4A, if all of the four actuators 7 (of which two are illustrated) are held in the "OFF" state; each wall 4 is buckled in the secondary deformation mode as shown in FIG. 4B, if only one of the front-side actuators 7A and the rear-side actuators 7B are turned into the "ON" state; and each wall 4 is buckled in the tertiary deformation mode as shown in FIG. 4C, if all of the four actuators 7 are turned into the "ON" state.

Figure 5A:
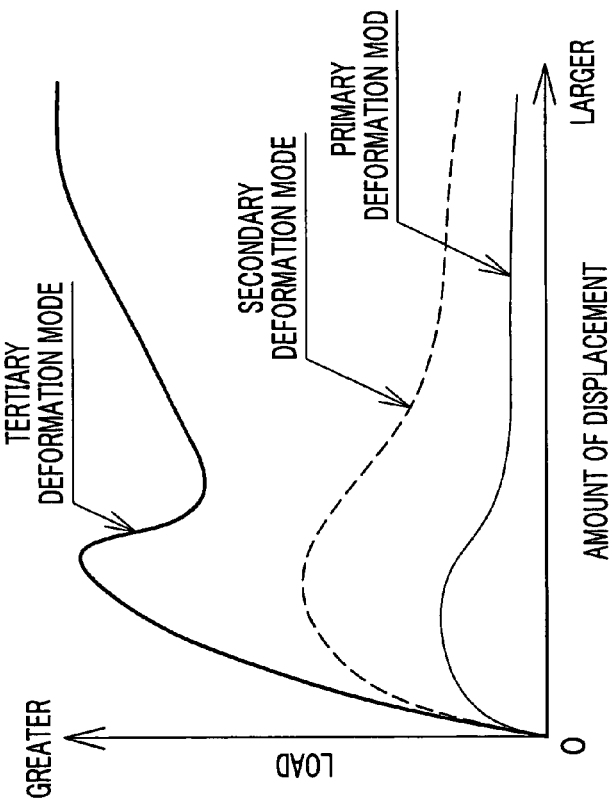
FIG. 5A shows a wall displacement vs. collision-resistant load graph for each deformation mode with respect to a material (e.g., aluminum) other than shape-memory alloys.
Figure 5B:
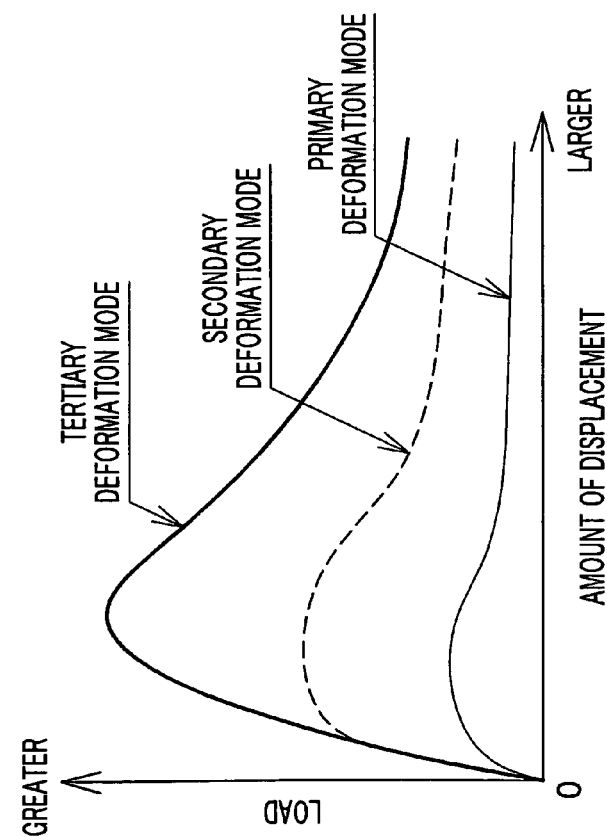
FIG. 5B shows a wall displacement vs. collision-resistant load graph for each deformation mode with respect to a shape-memory alloy.

As described above, the rigidity of each wall 4 can be varied by switching the deformation mode of the wall 4 as appropriate. Referring now to FIGS. 5A and 5B, a description will be given of a collision-resistant load for each deformation mode with a comparison made between a shape-memory alloy as used in the present embodiment and a material other than the shape-memory alloy. FIG. 5A shows a wall displacement versus collision-resistant load graph for each deformation mode with respect to a material such as aluminum other than shape-memory alloys. FIG. 5B shows a wall displacement versus collision-resistant load graph for each deformation mode with respect to a shape-memory alloy.

In FIGS. 5A and 5B, three curves are designated by "primary deformation mode", "secondary deformation mode" and "tertiary deformation mode", but more exactly correspond to specific buckling lengths of the wall 4 in the primary, secondary and tertiary deformation modes, respectively. To be more specific, the buckling length in the primary deformation mode is the length between the front end 41 and the rear end 42 of the wall 4; the buckling length in the secondary deformation mode is the length between the front-side actuator 7A and the rear end 42 of the wall 4 or between the front end 41 of the wall 4 and the rear-side actuator 7B; and the buckling length in the tertiary deformation mode is the length between the front end 41 and the front-side actuator 7A, between the front-side actuator 7A and the rear-side actuator 7B, or between the rear-side actuator 7B and the rear end 42 of the wall 4. Thus, the wall buckling length in the secondary deformation mode is shorter than that in the primary deformation mode, and the buckling length in the tertiary deformation mode is shorter than that in the secondary deformation mode.

As apparent from FIGS. 5A and 5B, regardless of the material which makes up the wall 4, the wall 4 configured to be buckled in the higher-order deformation mode (having shorter buckling length) exhibits greater collision-resistant load, and thus provides greater rigidity in the apparatus 1 (i.e., in the vehicle body). The difference in material (between the wall 4 made of a shape-memory alloy and that made of any other material) becomes appreciable when the wall 4 is buckled in the tertiary deformation mode. To illustrate the difference, a reference is made to FIGS. 5A and 5B. As shown in 5A, when the material other than shape-memory alloy is used, the collision-resistant load decreases after peaking when buckling occurs. In contrast, as shown in FIG. 5B, when a shape-memory alloy is used, the collision-resistant load decreases temporarily after buckling occurs, and then increases again. It is clear from these graphs that the use of a shape-memory alloy enormously increases the rigidity of the material in the tertiary deformation mode beyond the level of rigidity represented when a material other than shape-memory alloy is used.

Next, a description will be given of an operation of the apparatus 1 for controlling the rigidity of a vehicle body, with reference to FIGS. 1 and 4.

Referring now to FIG. 1, assume as an instance first taken up for discussion that a vehicle M collides with a small object (e.g., a utility pole, a compact car, etc.). When the vehicle M is going to collide with the small object, for example, two adjacent sensing elements 2b, 2c among the sensing elements 2a–2f of the collided object detection sensor 2 detect the object to be collided with, and each output a detection signal to the control unit 3. The control unit 3 in turn determines that an area covered by the two sensing elements 2b, 2c is to be collided with, and thus the object to be collided with is small. The control unit 3, having determined that the object to be collided with is small, while giving consideration to other information such as a vehicle speed, controls the actuators 7, and for example turns all the actuators 7 into the "ON" state so that all the walls 4 are buckled in the primary deformation mode, as illustrated in FIG. 4A.

Referring again to FIG. 1, assume that a vehicle M collides with a large object (e.g., a large-sized car, etc.). When the vehicle M is going to collide with the large object, four adjacent sensing elements 2a, 2b, 2c, 2d among the sensing elements 2a–2f of the collided object detection sensor 2 detect the object to be collided with, and each output a detection signal to the control unit 3. The control unit 3 in turn determines that an area covered by the four sensing elements 2a, 2b, 2c, 2d is to be collided with, and thus the object to be collided with is large. The control unit 3, having determined that the object to be collided with is large, while giving consideration to other information such as a vehicle speed, controls the actuators 7, and for example holds all the actuators 7 in the "OFF" state so that all the walls are buckled in the tertiary deformation mode, as illustrated in FIG. 4C.

Although the present embodiment is exemplarily premised that all the actuators 7 are held "OFF" or turned "ON" to allow all the walls 4 to be buckled in the primary or tertiary deformation mode equally, the foregoing are only a few of the examples, and the present invention is not limited thereto. It is thus to be understood that either of the front-side actuators 7A or the rear-side actuators 7B of each wall 4 may be turned into the "ON" state to allow the wall 4 to be buckled in the secondary deformation mode where appropriate as illustrated in FIG. 4B. Moreover, it is to be understood that not every wall 4 may necessarily be buckled in a single deformation mode in a collision, but control may be exercised in such a manner that some of the walls 4 corresponding to an area of the vehicle M which collides with an object (e.g., only the right half of the walls 4 corresponding to the sensing elements 2a, 2b, 2c of the collided object detection sensor 2) are switched into an adequate deformation mode, while others are held in or switched into a different deformation mode.

In a collision as described above, the reinforcing members 8 as shown in FIG. 2 are each buckled, like the walls 4, in the primary, secondary or tertiary mode according to control exercised over whether or not to retract each of the movable pins 71 inserted in the holes provided each reinforcing member 8. It is thus understood that the rigidity of each reinforcing member 8 is controlled in such a manner as that of each wall 4. In the present embodiment, the top plate 61 and bottom plate 63 of the slide member 6 are fastened with the upper end portion 43 and the lower end portion 44 of the wall 4, respectively, and thus restrained from deforming in vehicle height directions by means of the movable pins 71 (and the fasteners 73). Such restraint laid on the top plate 61 and the bottom plate 63 in deforming vertically is designed to be lifted as a result of retraction of the movable pins 71. More specifically, when the movable pins 71 are retracted out of the holes of the top plate 61 and the bottom plate 63 of the slide member 6, the slide member 6 is slidable in vehicle length (front and rear) directions without restraint; however, when the movable pins 71 remain inserted in the holes of the top plate 61 and the bottom plate 63 of the slide member 6, the slide member 6 is fastened with the walls 4 and the reinforcing members 8, and is thus buckled, like the walls 4 and the reinforcing members 8, in the primary, secondary or tertiary mode according to the control exercised over whether or not to retract each of the movable pins 71.

In the foregoing description of the operation of the apparatus 1, each actuator 7 is controlled according to the size (dimensions) of an object to be collided with, but the present invention is not limited thereto. For example, each actuator 7 may be controlled according to the hardness of the object to be collided with, as described in connection with the collided object detection sensor 2. In this instance, for example, if the control unit 3 determines that the hardness of an object to be collided with detected from the output of the sensing elements 2a–2f of the collided object detection sensor 2 is lower than a predetermined value, all the actuators 7 are turned "ON" to allow all the walls 4 to be buckled in the primary deformation mode, and if the control unit 3 determines that the hardness of the object to be collided with is equal to or higher than the predetermined value, all the actuators 7 are held in the "OFF" state to allow all the walls 4 to be buckled in the tertiary deformation mode.

Advantageous effects to be achieved in the above-described embodiments will be described below.

Since control can be exercised over the rigidity of the walls 4 by a simple operation of establishing and releasing connection between the upper end portion 43 of the wall 4 and the top plate 61 of the slide member 6 and between the lower end portion 44 of the wall 4 and the bottom plate 63 of the slide member 6, i.e., laying and lifting restraint on deformation of the wall 4 in vehicle width directions, the rigidity of a vehicle body can be controlled with a force smaller than that required in the conventional apparatus. Accordingly, miniaturization of the apparatus 1 itself as well as a battery for powering the apparatus can be achieved.

Since opposite surfaces of the top and bottom plates 61, 63 of the slide member 6 are formed with projections and depressions, the slide member 6 can be designed to have greater rigidity. Moreover, since the walls 4 are provided between the inner flat surface portions 61b and the inner flat surface portions 63b (i.e., at positions corresponding to the projections of the opposite surfaces—inner flat surfaces of inwardly positioned plate-like portions—of the top and bottom plates 61, 63), the vertical length of the walls 4 (except the upper end portion 43 and the lower end portion 44) can be made shorter; therefore, the walls 4 can be designed to have greater rigidity.

Since the wall 4 is made of a shape-memory alloy, increase in collision-resistant load thereof takes place again after buckling in the tertiary deformation mode, and thus the rigidity of the wall 4 (as well as of the apparatus 1, and of the vehicle body) can be enhanced. Further, the reinforcing member 8 and the slide member 6, like the wall 4, are also made of a shape-memory alloy, and the rigidity of the vehicle body can be considerably enhanced, especially, upon buckling in the tertiary deformation mode.

It is contemplated that numerous modifications may be made to the exemplary embodiments of the invention without departing from the spirit and scope of the present invention as defined in the following claims.

In the present embodiment, the walls 4 are disposed in a direction parallel to the vehicle length direction, but the present invention is not limited thereto. Rather, the apparatus 1 for controlling the rigidity of a vehicle body may be oriented in any direction as long as the walls 4 are disposed in a direction parallel with a direction of a likely collision load. For example, to make the vehicle body ready for a lateral crash (or sideswipe), the apparatus 1 for controlling the rigidity of the vehicle body may be provided at each side of the vehicle M so that the walls 4 are disposed in the vehicle width direction.

Although the present embodiment shows a typical instance in which the walls 4, slide member 6 and reinforcing members 8 are all made of a shape-memory alloy, the present invention is not limited thereto. For example, only the walls 4 may be made of a shape-memory alloy, and all these components 4, 6 and 8 may be made of a material other than shape-memory alloys.

Figure 6:
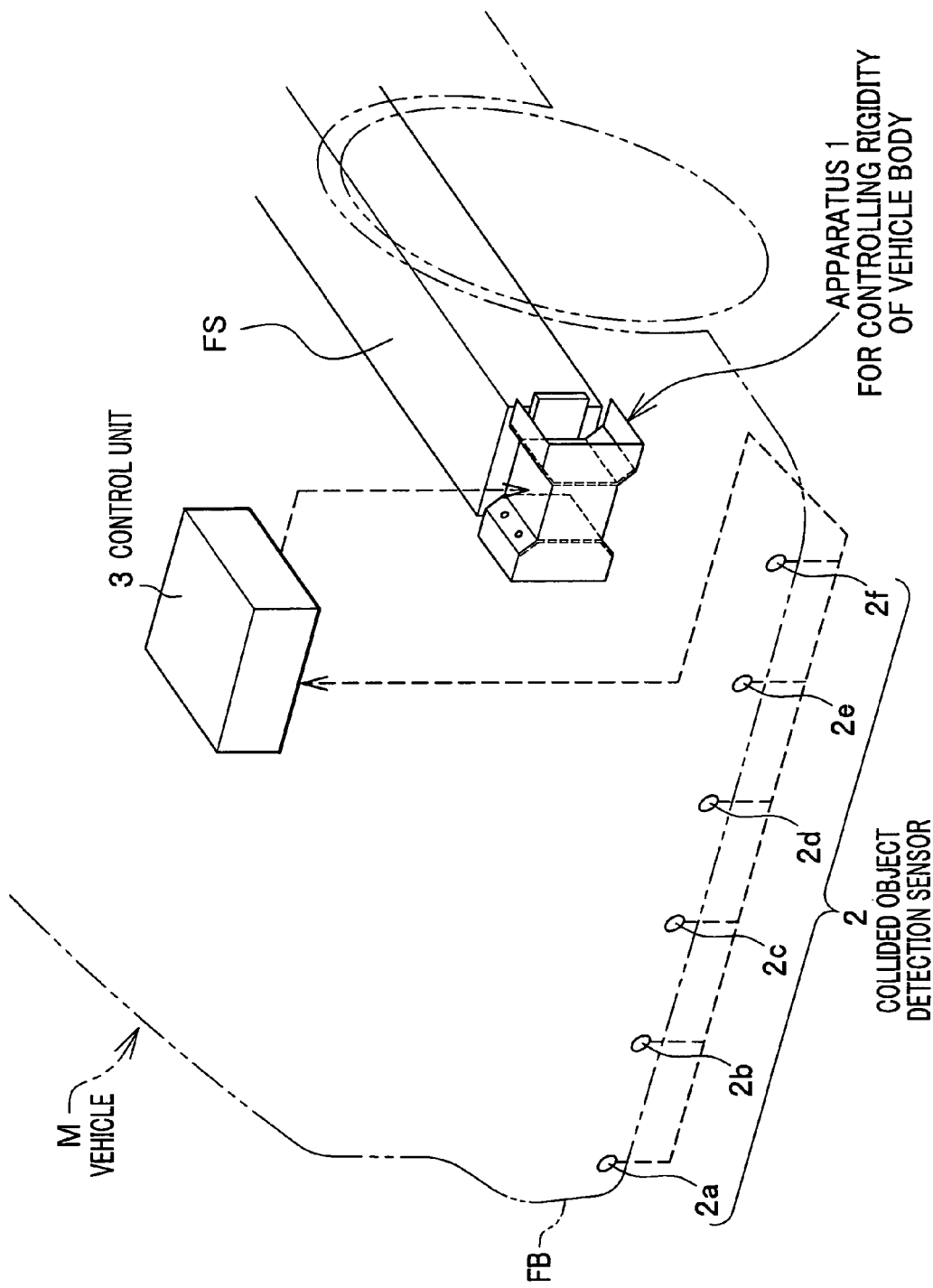
FIG. 6 is a perspective view showing a construction in which the apparatus of FIG. 1 is provided at a front end of a front side frame of the vehicle.

In the present embodiment, the apparatus 1 for controlling the rigidity of a vehicle body is formed in substantially the same dimensions as those of the front bumper FB, but the present invention is not limited thereto. Only a portion of which the rigidity should be controlled appropriately (e.g., in a left-side half or a right-side half of the front bumper FB, or at an end of a front side frame FS as shown in FIG. 6) may be provided with the apparatus 1 for controlling the rigidity of a vehicle body. Moreover, in the present embodiment, the actuators 7 are controlled according to the size or other properties of an object to be collided with, but the present invention is not limited thereto. The actuators 7 may be controlled according to a collision form, such as a full frontal or offset frontal crash. Further, the actuators 7 may be controlled according to both of the collision form and the property of an object to be collided with.

What is claimed is:

1. An apparatus for controlling rigidity of a vehicle body, comprising:
    a plate member disposed parallel with a direction of a collision load, the plate member having a first end facing toward the direction of the collision load from which the collision load is applied to the vehicle body, a second end opposite to the first end, and top and bottom ends;
    a base member disposed at the second end of the plate member;
    a slide member having opposite top and bottom plates and one vertical plate contiguously extending between edges of the top and bottom plates, with the top plate disposed over the top end of the plate member, the bottom plate disposed underneath the bottom end of the plate member, and the vertical plate disposed at the first end of the plate member, wherein the slide member is slidable with respect to the base member in a collision; and
    an attachment for establishing and releasing connection between the top end of the plate member and the top plate of the slide member and between the bottom end of the plate member and the bottom plate of the slide member.

2. The apparatus according to claim 1, wherein opposite surfaces of the top and bottom plates of the slide member are formed with projections and depressions.

3. The apparatus according to claim 2, wherein the projections and depressions formed on the opposite surfaces of the top and bottom plates are arranged in such a manner that the opposite surfaces are plane-symmetric to each other; and
    wherein the plate members are arranged at positions corresponding to the projections of the opposite surfaces of the top and bottom plates.

4. The apparatus according to claim 1, wherein the plate member is made of a shape-memory alloy.

5. The apparatus according to claim 3, wherein the plate member is made of a shape-memory alloy.

6. The apparatus according to claim 1, wherein the slide member is made of a shape-memory alloy.

7. The apparatus according to claim 2, wherein the slide member is made of a shape-memory alloy.

8. The apparatus according to claim 1, wherein the attachment establishes the connection between the plate member and the slide member at a plurality of points arranged at corresponding locations on each of the top and bottom ends of the plate member; and
    wherein the attachment is configured to release the connection at each of the plurality of points selected according to a deformation mode of the plate member that is predetermined for each of particular forms of a collision and/or particular properties of an object to be collided with.

9. The apparatus according to claim 8, wherein the attachment comprises a plurality of actuators detachably attached to the plate member and the slide member at the plurality of points.

10. The apparatus according to claim 9, wherein the plurality of actuators each comprise:
    a movable pin retractably inserted in a hole provided in the plate member and a hole provided in the slide member; and
    a driving element for retracting the movable pin.

11. The apparatus according to claim 10, wherein each of the plurality of actuators further comprises a fastener detachably attached to a distal end of the movable pin inserted in the holes of the plate member and the slide member, to fasten the plate member and the slide member together.

12. The apparatus according to claim 1, further comprising a reinforcing member interposed between the top end of the plate member and the top plate of the slide member and between the bottom end of the plate member and the bottom plate of the slide member.

13. The apparatus according to claim 10, further comprising a reinforcing member interposed between the plate member and the slide member at points thereon corresponding to the plurality of points at which the attachment establishes the connection using the plurality of actuators, and wherein each of the plurality of actuators further comprises a fastener detachably attached to a distal end of the movable pin inserted in the holes of the plate member and the slide member, and a hole provided in the reinforcing member, to fasten the plate member, the reinforcing member and the slide member together.

14. The apparatus according to claim 12, wherein the reinforcing member is made of a shape-memory alloy.

15. The apparatus according to claim 13, wherein the reinforcing member is made of a shape-memory alloy.

16. The apparatus according to claim 1, further comprising a collided object detection sensor for detecting at least one of a collision form and a property of an object to be collided with, wherein the attachment is configured to establish and release the connection between the plate member and the slide member according to the at least one of the collision form and the property of the object.

* * * * *